United States Patent [19]

Omo, Jr.

[11] Patent Number: 4,457,415

[45] Date of Patent: Jul. 3, 1984

[54] ADJUSTABLE SHOE CLUTCH AND BRAKE ASSEMBLY

[75] Inventor: R. B. Omo, Jr., Bath, Me.

[73] Assignee: Bath Iron Works Corporation, Bath, Me.

[21] Appl. No.: 354,370

[22] Filed: Mar. 3, 1982

[51] Int. Cl.³ ............................................. B60R 41/24
[52] U.S. Cl. ........................... 192/12 C; 192/111 T; 192/85 AT; 192/110 R
[58] Field of Search ..................... 192/12 C, 89 R, 60, 192/77, 78, 110 S, 113 R, 110 R, 85 AT; 403/359

[56] References Cited

U.S. PATENT DOCUMENTS

| | | |
|---|---|---|
| 731,483 | 11/1902 | Matson . |
| 1,669,878 | 6/1927 | Monroe . |
| 1,960,414 | 5/1934 | Kacer et al. ........................... 192/60 |
| 2,538,997 | 10/1947 | Weiland ................................ 192/85 |
| 2,631,477 | 3/1953 | Ball ..................................... 192/12 C |
| 2,856,044 | 12/1956 | Koenig et al. ........................... 192/4 |
| 4,118,134 | 10/1978 | Mansel ................................. 403/359 |

FOREIGN PATENT DOCUMENTS

| | | | |
|---|---|---|---|
| 0474186 | 6/1951 | Canada ............................. | 192/12 C |
| 0649306 | 1/1951 | United Kingdom .............. | 192/12 C |
| 0662307 | 12/1951 | United Kingdom .............. | 192/12 C |

Primary Examiner—George H. Krizmanich
Assistant Examiner—M. Manley
Attorney, Agent, or Firm—Shlesinger, Arkwright, Garvey & Fado

[57] ABSTRACT

In a fly wheel power press having a rotatable drive shaft mounted in a housing and with an H-shaped yoke to which pivot pins are mounted and from which a pair of clutch shoes and brake shoes depend, an adjustment mechanism having a knurled portion on the pin and a cooperating knurled aperture in a lock plate which is in sliding engagement with the knurled portion of the pin so as to permit securement of the lock plate, and thereby the clutch and brake shoes, in a pre-selected adjusted position to one of the uprights is disclosed.

7 Claims, 5 Drawing Figures

ADJUSTABLE SHOE CLUTCH AND BRAKE ASSEMBLY

This invention relates to an adjustable shoe clutch and brake assembly for use in machines of the flywheel power press type.

HISTORICAL BACKGROUND

Prior developments of adjustable shoe type clutch and brakes for use in machines of the flywheel power press type have been complex and of considerable weight. The high weight factor creates a high operating cost because of the requirement of high horse power to operate. Furthermore, prior art did not completely disengage all of the parts creating unnecessary wear and heat. Another difficulty with the prior art was that the clutches were not self-adjusting therefore increasing maintenance costs. Further problems were involved in servicing of the equipment requiring in many instances a complete removal of the units from the press before they could be serviced. Another consideration is that the clutch and brake assemblies were separable and thus could be engaged simultaneously causing damage and undue wear to the friction surfaces. Because of the possibility that they would engage simultaneously the clutches would slip under overload and possibly cause damage to the work.

OBJECTS AND SUMMARY

It is therefore an object of the present invention to provide an adjustable shoe-type clutch and brake in which the clutch and brake shoes float and align themselves automatically.

A further object of this invention is to provide a clutch and brake assembly which will maintain piston and shoe movement to a minimum because of the ability to adjust as required.

Yet another object of this invention is to provide a clutch and brake assembly which reduces air consumption for each engagement.

Still another object of this invention is to provide a clutch and brake assembly which will reduce substantially the weight over prior devices and thus assure a considerable saving in horsepower.

Another object of this invention is to provide a clutch and brake assembly in which the number of parts is substantially reduced.

Yet a further object of this invention is to provide a clutch and brake assembly which has quicker starting and stopping action and which reduces wear and heat assuring longer friction life.

Still another object of this invention is to provide a clutch and brake assembly which can be applied to both old and new presses.

A further object of this invention is to provide a clutch and brake assembly which can be readily serviced without removal from the press.

Another object of this invention is to provide a clutch and brake assembly in which the clutch and brake mechanisms cannot become separated or engaged simultaneously.

A further object of this invention is to provide a clutch and brake assembly in which the clutch can be set to slip under overload.

Yet another object of this invention is to provide a clutch and brake assembly which is self-adjusting and in which the air cylinders provide maximum performance with minimum amounts of air.

To summarize this invention it relates to an adjustable shoe, clutch and brake assembly of the automatic type.

These and other objects of this invention will be apparent from the following description and claims.

In the accompanying drawings which illustrate by way of example various embodiments of this invention:

FIG. 4 is an exploded perspective view of the eccentric pin and adjusting mechanism of the clutch and brake assembly.

FIG. 5 is an enlarged cross-sectional view of the rocker and eccentric unit.

FIGS. 1 THROUGH 5

Figure 1:
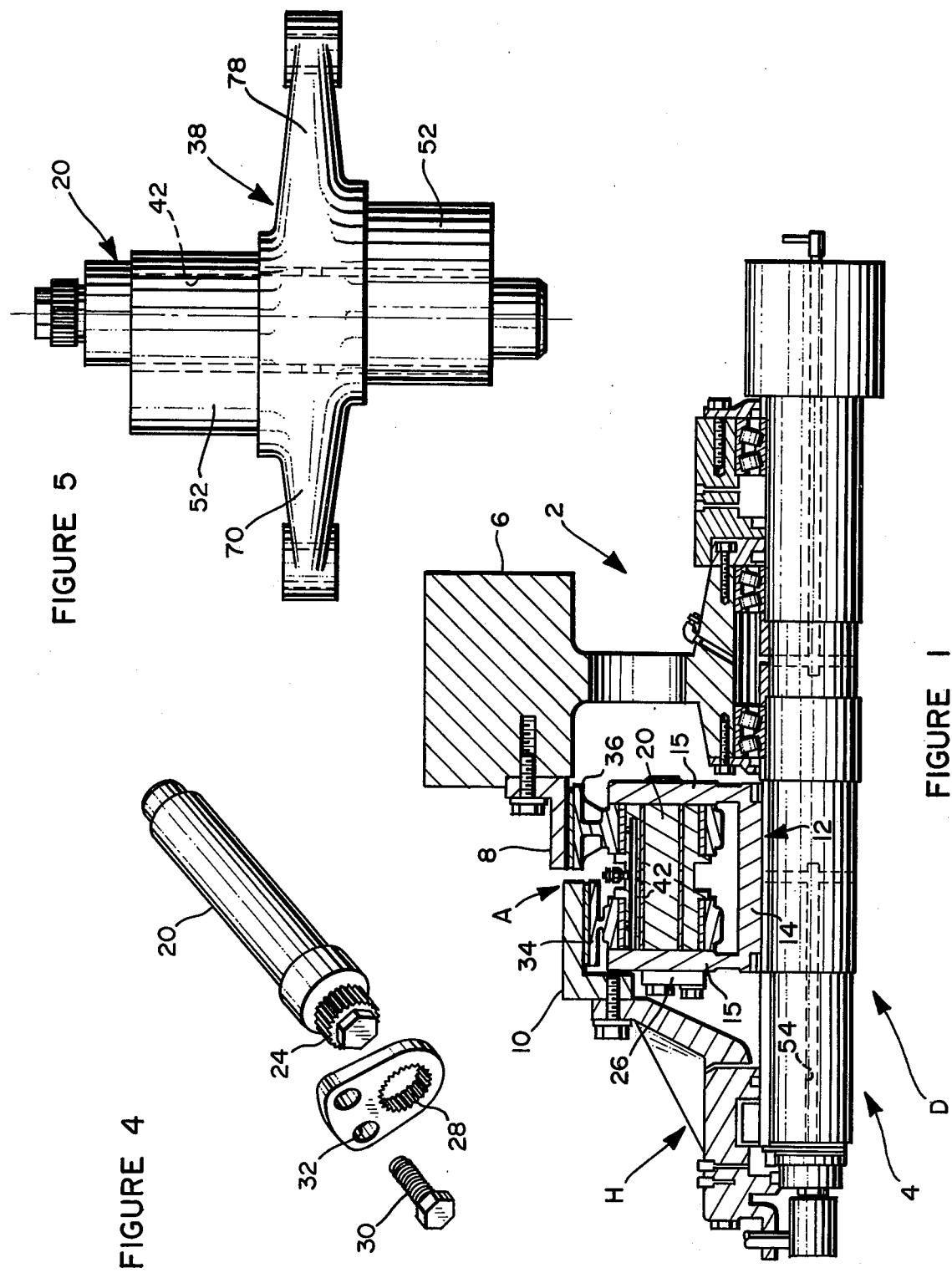
FIG. 1 is a cross-sectional view of one-half of the adjustable shoe clutch and brake assembly mounted on a drive shaft showing the flywheel, the clutch drum and the brake drum units with the air passageways shown in phantom lines.

In FIG. 1, the clutch and brake assembly A is shown mounted on a drive shaft D. The drive shaft D has mounted thereon an energy input unit 2 and an energy output unit 4. Mounted on energy input unit 2 is a flywheel 6. It is not necessary to go into the details of the energy input unit 2 other than to say that the flywheel 6 would be driven by a mechanism not shown for storing energy to drive a ram for a power press or the like.

Secured to one face of the flywheel 6 is a clutch drum 8.

The assembly's support housing H is only fragmentally shown in the drawings. The support housing H would position the drive shaft D which provides power takeoff means as required in any of many different forms including gearing, belt drive mechanisms and the like. Mounted on the support housing H is a brake drum 10.

The clutch and brake assembly A includes an H-shaped yoke 12. The crossbar of the H-shaped yoke 12 includes a sleeve 14 provided with uprights 15 extending both above and below the drive shaft D. The uprights 15 include upper journals 16 and lower journals 18.

The uprights 15 are spaced from each other. Mounted in the journals 16 and 18 are eccentric pins 20 and 22. The eccentric pins 20 and 22 as shown in FIG. 4 include a knurled surface 24. A lock plate 26 is provided with teeth 28 cooperating with the knurled surface 24 to position the eccentric pin 20 or 22 as the case may be. The lock plate 26 may be bolted or otherwise secured to one of the uprights 15 by means of a bolt 30 which may be engaged in one of the holes 32 for fine adjustment purposes.

The clutch and brake assembly includes a pair of brake shoes 34 and a pair of clutch shoes 36.

Figure 3:
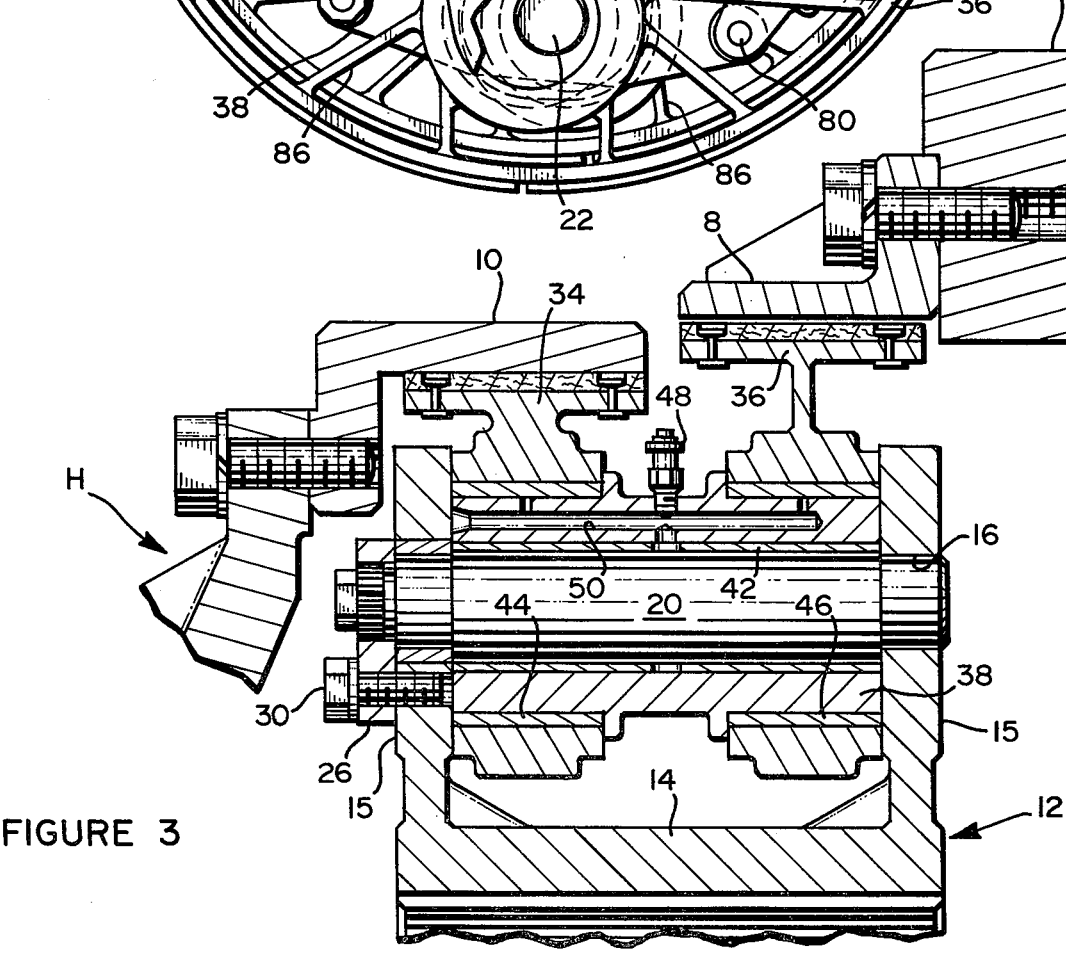
FIG. 3 is an enlarged cross-sectional fragmentary view showing the assembly in conjunction with portions of the brake and clutch drums.

The pair of brake shoes 34 are mounted adjacent the left upright 15 as shown in FIG. 3 and the pair of clutch shoes 36 mounted adjacent the right upright 15.

Mounted on eccentric pins 20 and 22 are rockers 38 best shown in FIG. 5. The rockers 38 they each include an eccentric pin bearing sleeve 42 and a brake shoe bearing sleeve 44 and a clutch shoe bearing sleeve 46. A grease fitting 48 is provided in the rockers 38 so that the various bearing sleeves 42, 44 and 46 can be lubricated through proper lubrication passageway 50.

In FIG. 5, the rockers 38 are shown with offset eccentric axles 52 on which are mounted the brake and clutch shoes 34 and 36.

The drive shaft D includes a fluid passageway 54 for bringing compressed air, hydraulic fluid or the like into piston cylinder assemblies 56. The compressed air comes through passageways 58 and 60 into the cylinder chamber 62. An access plate 64 is provided on the sleeve 14 for quick inspection of the air passageways 58 and 60 should there be a clogging thereof. A piston 66 is mounted in the cylinder chamber 62. The piston is connected to linkage 68 which in turn is connected to rocker arm 70. Secured to the bottom of the piston cylinder assemblies is a spring mounting bracket 72 which carries concentric compression springs 74 and 76. The spring mounting bracket 72 is connected to rocker arm 78 by a pin 80 or the like. A spring mounting pin 82 is shown partially removed from the spring mounting bracket 72 at the left side of FIG. 2. The pin 82 is threaded down into the mounted bracket and hidden as shown in the right-hand spring mounting bracket 72 of FIG. 2.

The sleeve 14 of the H-shaped yoke 12 is fixed to the drive shaft D by means of keys 84.

Figure 2:
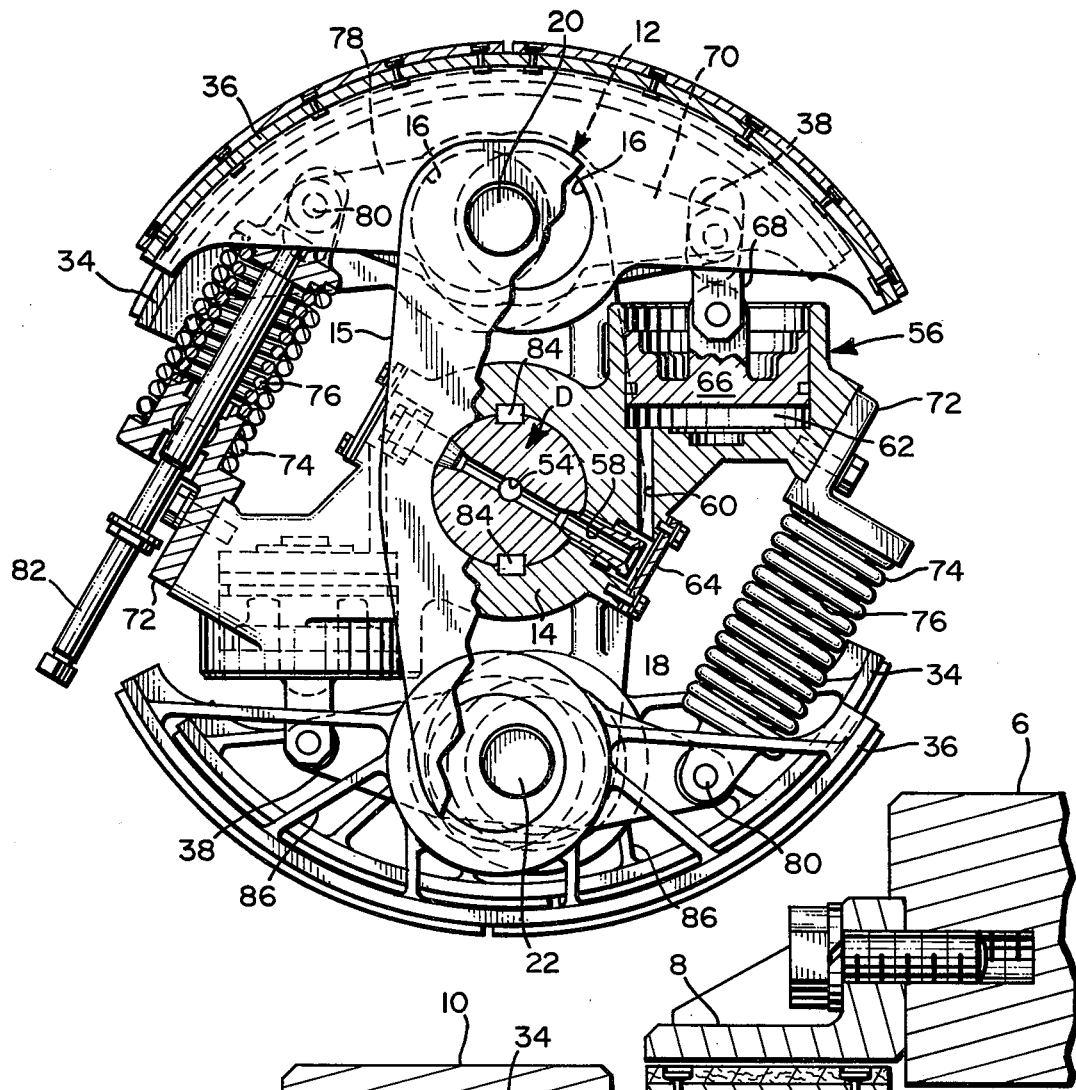
FIG. 2 is a cross-sectional view of the clutch brake assembly portions shown in phantom lines.

The brake and clutch shoes 34 and 36 may be formed with spaced ribbing 86 as best shown in the lower shoes in FIG. 2 and with solid webbing as best shown in the upper shoes of FIG. 2.

OPERATION

In operation, the adjustable shoe clutch and brake assembly works as follows:

The flywheel 6 is rotated to store energy therein for use by a press or the like. To initiate clutch shoe 36 engagement with clutch drum 8, air is introduced into the piston cylinder assemblies 56. This forces the clutch shoes 36 into contact with the clutch drum 8 which is attached to the flywheel and is moving with the flywheel. Concurrently, due to the mechanical interlock, the brake shoes 34 are pulled away from the brake drum 10 and the brake springs 74 and 76 are compressed thus disengaging the brake shoes 34 from the brake drums 10.

To disengage the clutch shoes 36, air is exhausted from the piston cylinder assemblies 56 allowing the pistons 66 to retract into the cylinder chambers 62. The brake springs 74 and 76 force the brake shoes 34 into contact with the brake drum 10 anchored to the support housing H of the press frame (not shown). At the same time, the clutch shoes 36 are pulled away from contact with the clutch drum 8, thus disengaging the flywheel 6.

The eccentric axles 52 of the rockers 38 are the mechanical interlock between the clutch shoes 36 and the brake shoes 34. The eccentric pins 20 and 22 provide adjustment means to permit the shoes 34 and 36 to be adjusted relative to the drums 8 and 10 so as to provide accurate control and take up wear where necessary.

Rotation of the pin 20 allows for this adjustment and locking of the lock plate maintains the shoes in proper position at all times.

While this invention has been described as having a preferred design, it will be understood that it is capable of further modification. This application is, therefore, intended to cover any variations, uses, or adaptations of the invention following the general principles thereof and including such departures from the present disclosure as come within known or customary practice in the art to which this invention pertains, and as may be applied to the essential features hereinbefore set forth and fall within the scope of this invention or the limits of the claims.

I claim:

1. In a machine of the fly wheel power press type having a support housing, a drive shaft mounted for rotation in said support housing, fluid supply means for said drive shaft, a fly wheel on said drive shaft, a clutch drum secured to said fly wheel, and a brake drum secured to said support housing, an adjustable shoe clutch and brake assembly comprising:
    (a) an H-shaped yoke having a cross-bar and a pair of uprights extending on either side therefrom and said cross-bar including a sleeve coaxially mounted on said drive shaft;
    (b) said uprights of said H-shaped yoke each having journals at their upper and lower ends to form a pair of cooperating upper journals and a pair of cooperating lower journals;
    (c) separate pivot pin means supported by each cooperative pair of journals;
    (d) each of said pivot pin means having movably mounted thereon a brake shoe and a clutch shoe for thereby providing a pair of brake shoes and a pair of clutch shoes for cooperation with their respective brake drum and clutch drum;
    (e) said pivot means being eccentric for providing rotational adjustment of its respective brake shoe by eccentric movement relative to its respective clutch shoe;
    (f) each of said pivot pin means including a knurled portion;
    (g) a pair of lock plates, each of said lock plates including a knurled aperture therethrough for cooperating with said knurled portion of its associated pivot pin means for sliding engagement therewith;
    (h) adjustment means associated with each of said lock plates and said uprights for positively securing each of said lock plates in a pre-selected adjustment position to an associated one of said uprights for adjustably positioning each of said lock plates relative to its associated upright;
    (i) said cross-bar having on either side thereof a piston cylinder assembly;
    (j) said piston cylinder assemblies each including fluid passage means for connection to said drive shaft fluid supply means to bring a fluid to and exhaust said fluid from said assembly;
    (k) said pivot means each having mounted thereon a rocker;
    (l) one of said rockers connect at one end to one of said piston cylinder assemblies and movable thereby and the other of said rockers connected at one end to the other of said piston cylinder assemblies and movable thereby;
    (m) said pair of brake shoes being mounted to said pivot pin means offset from said pair of clutch shoes whereby during operation of said clutch and brake assembly only one pair of said shoes will be operable at any time;
    (n) first spring means connected at one end to one of said piston cylinder assemblies and at the other end to one of said rockers;
    (o) second spring means connected to one end to the other of said piston cylinder assemblies and at the other end of the other of said rockers;

(p) whereby, introduction of said fluid into said piston cylinder assemblies causing displacement of said piston cylinder assemblies for engaging said clutch shoes with said clutch drum thereby so that said assemblies and said drive shaft will be driven by said fly wheel; and, (q) whereby, when said fluid is exhausted from said piston cylinder assemblies said brake shoes will be driven thereby against said brake drum by said spring means to brake said drive shaft.

2. In a machine as in claim 1 and wherein:
(a) said spring means each includes a pair of concentric adjacent springs.

3. In a machine as in claim 1 and wherein:
(a) said uprights of said H-shaped yokes have a center line and one journal of an upright has its center to one side of said center line and the other journal of said respective upright has its center to the other side of said center line.

4. As in claim 1 and including:
(a) lubrication means for said pivot pin means.

5. As in claim 1 and including:
(a) ready access means in said crossbar to said fluid passage means.

6. As in claim 1 and wherein:
(a) said piston cylinder assemblies are diagonally opposed to each other.

7. As in claim 1 and wherein:
(a) said fluid passage means includes removable cover plate means.

* * * * *